UNITED STATES PATENT OFFICE.

MELCHIOR BOENIGER, OF BASEL, SWITZERLAND, ASSIGNOR TO CHEMICAL WORKS FORMERLY SANDOZ, OF BASEL, SWITZERLAND.

MANUFACTURE OF CHROMABLE SECONDARY DISAZO DYESTUFFS.

1,199,234.  Specification of Letters Patent.  Patented Sept. 26, 1916.

No Drawing.   Application filed May 13, 1916.  Serial No. 97,294.

*To all whom it may concern:*

Be it known that I, MELCHIOR BOENIGER, of Basel, Switzerland, a citizen of the Swiss Republic, have invented certain new and useful Improvements in the Manufacture of Chromable Secondary Disazo Dyestuffs, of which the following is a specification.

According to the specification of U. S. patent application Serial Number 75031, chromable green secondary disazo dystuffs are produced by combination of the diazotized monoazo dyestuffs obtained from o-diazophenols and 1.8-aminonaphthol-3.6-disulfonic acid, with pyrazolones having their 4 position unoccupied. It has now been found that starting in this process from monoazo dyes resulting by alkaline combination of o-diazophenols, their nitro and halogen derivatives and their sulfonic acids with 2-amino-8-oxynaphthalene-6-sulfonic acid, new and very valuable o-oxydisazo dyestuffs are formed, whose dyeings on wool are changed by subsequent chroming into brown to bronze-brown shades fast to milling and potting and of excellent fastness to light.

Example 1: The monoazo dye obtained from 19.9 parts diazotized picramic acid and 23.9 parts 2-amino-8-oxynaphthalene-6-sulfonic acid by alkaline combination, is diazotized with 7 parts of nitrite, and the diazo compound is coupled with the soda alkaline solution of 25.4 parts of 1-p-sulfophenyl-3-methyl-5-pyrazolone. The dyestuff is precipitated by addition of common salt, filtered off and dried. In an acid bath it dyes unmordanted wool in red brown shades, changing on subsequent chroming into bronze brown fast to milling and potting and of excellent fastness to light.

Example 2: Diazotize the monoazo dye obtained in alkaline solution from 23.4 parts of diazotized 2-amino-6-nitro-1-oxybenzol-4-sulfonic acid and 23.9 parts of 2-amino-8-oxynaphthalene-6-sulfonic acid with 7 parts of nitrite, and combine with the soda alkaline solution of 17.4 parts of 1-phenyl-3-methyl-5-pyrazolone. The disazo dyestuff separates out immediately in the form of a black powder, which is worked up as usual. It produces on wool in an acid bath reddish brown shades, turning to bronze brown on subsequent chroming. The after chromed dyeings are distinguished by an excellent fastness to washing, milling and light.

What I claim and desire to secure by Letters Patent is:—

1. Process for the manufacture of chromable secondary disazo dyestuffs, comprising further diazotizing the monoazo dyestuff obtained in alkaline combination from an o-diazophenol and 2-amino-8-oxynaphthalene-6-sulfonic acid, and coupling the resulting body with a pyrazolone having its 4 position unoccupied.

2. Process for the manufacture of chromable secondary disazo dyestuffs, comprising further diazotizing the monoazo dyestuff obtained in alkaline combination from a nitro-o-diazophenol and 2-amino-8-oxynaphthalene-6-sulfonic acid, and coupling the resulting body with a pyrazolone having its 4 position unoccupied.

3. Process for the manufacture of chromable secondary disazo dyestuffs, comprising further diazotizing the monoazo dyestuff obtained in alkaline combination from 2-diazo-6-nitro-1-oxybenzol-4-sulfonic acid and 2-amino-8-oxynaphthalene-6-sulfonic acid, and coupling the resulting body with a pyrazolone having its 4 position unoccupied.

4. Process for the manufacture of chromable secondary disazo dyestuffs, comprising further diazotizing the monoazo dyestuff obtained in alkaline combination from 2-diazo-6-nitro-1-oxybenzol-4-sulfonic acid and 2-amino-8-oxynaphthalene-6-sulfonic acid, and coupling the resulting body with 1-p-sulfophenyl-3-methyl-5-pyrazolone.

5. The new secondary o-oxydisazo dyestuffs being derived from pyrazolones of unoccupied 4 position and a diazotized monoazo dyestuff, obtained by alkaline combination of an o-diazophenol with 2-amino-8-oxynaphthalene-6-sulfonic acid, giving by subsequent chroming of their dyeings on wool, brown shades fast to milling, potting and light, yielding upon reduction with stannous chlorid and hydrochloric acid an o-aminophenol compound, 2.7-diamino-8-oxynaphthalene-6-sulfonic acid and a 4-amino-5-pyrazolone compound.

6. The new secondary o-oxydisazo dyestuffs being derived from pyrazolones of unoccupied 4 position and a diazotized monoazo dyestuff, obtained by alkaline combination of a nitro o-diazophenol compound with 2-amino-8-oxynaphthalene-6-sulfonic acid, giving by subsequent chroming of their dyeings on wool, brown shades fast to milling, potting and light, yielding upon reduction with stannous chlorid and hydrochloric acid an amino o-aminophenol compound, 2.7-diamino-8-oxynaphthalene-6-sulfonic acid and a 4-amino-5-pyrazolone compound.

7. The new secondary o-oxydisazo dyestuffs being derived from pyrazolones of unoccupied 4 position and a diazotized monoazo dyestuff, obtained by alkaline combination of 2-diazo-6-nitro-1-oxybenzol-4-sulfonic acid with 2-amino-8-oxynaphthalene-6-sulfonic acid, giving by subsequent chroming of their dyeings on wool, brown shades fast to milling, potting and light, yielding upon reduction with stannous chlorid and hydrochloric acid 2.6-diamino-1-oxybenzol-4-sulfonic acid and a 4-amino-5-pyrazolone compound.

8. The new secondary o-oxydisazo dyestuff being derived from 1-p-sulfophenyl-3-methyl-5-pyrazolone and a diazotized monoazo dyestuff obtained by alkaline combination of 2-diazo-6-nitro-1-oxybenzol-4-sulfonic acid with 2-amino-8-oxynaphthalene-6-sulfonic acid, giving by subsequent chroming of its dyeings on wool bronze brown shades fast to milling, potting and light, yielding upon reduction with stannous chlorid and hydrochloric acid 2.6-diamino-1-oxybenzol-4-sulfonic acid and 1-p-sulfophenyl-3-methyl-4-amino-5-pyrazolone.

In witness whereof, I have hereunto signed my name in the presence of two subscribing witnesses.

MELCHIOR BOENIGER.

Witnesses:
GEO. H. WAGNER,
WERNER PAUFFAEBERY.